United States Patent

[11] 3,583,519

| [72] | Inventors | Raymond Joseph Meyer<br>Cedar Falls;<br>Lawrence George Halpin, Waterloo, both of, Iowa |
|---|---|---|
| [21] | Appl. No. | 857,527 |
| [22] | Filed | Sept. 12, 1969 |
| [45] | Patented | June 8, 1971 |
| [73] | Assignee | Deere & Company<br>Moline, Ill. |

[54] VEHICLE INSTRUMENT PANEL COVER
6 Claims, 4 Drawing Figs.

[52] U.S. Cl............................................. 180/90, 296/70
[51] Int. Cl........................................... B60k 35/00
[50] Field of Search........................................ 180/90; 296/70; 70/237, 78; 312/291

[56] References Cited
UNITED STATES PATENTS
3,302,743  2/1967  Mosdnera.................. 180/90
3,452,835  7/1969  Deci et al.................. 180/90

Primary Examiner—Benjamin Hersh
Assistant Examiner—Robert R. Song
Attorneys—H. Vincent Harsha, Harold M. Knoth, William A. Murray, John M. Nolan and Jimmie R. Oaks ABSTRACT: A four-wheel drive articulated loader has an elevated operator's station with an instrument panel through which projects the steering column of the vehicle. An instrument panel cover is mounted on a transverse hinge below the instrument panel to swing between an open stored position wherein it is folded back and latched under the instrument panel and a closed position wherein it is latched over the instrument panel. The cover latch is carried by a section of the cover which is removable to expose a notch in the upper side of the cover to receive the steering column as the cover is swung to its closed position. The section is then replaced and fixed by the latch it carries.

PATENTED JUN 8 1971
3,583,519
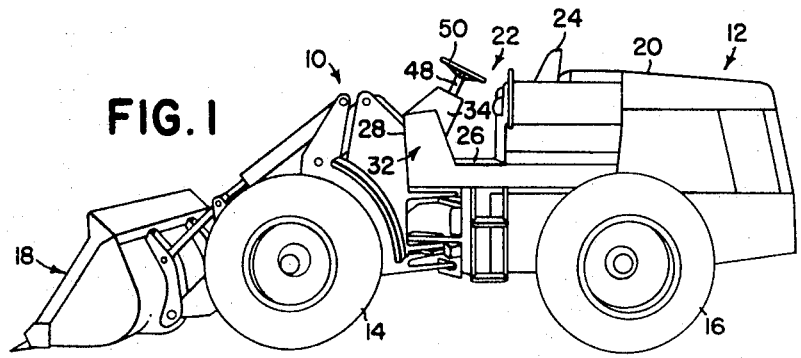
FIG. 1
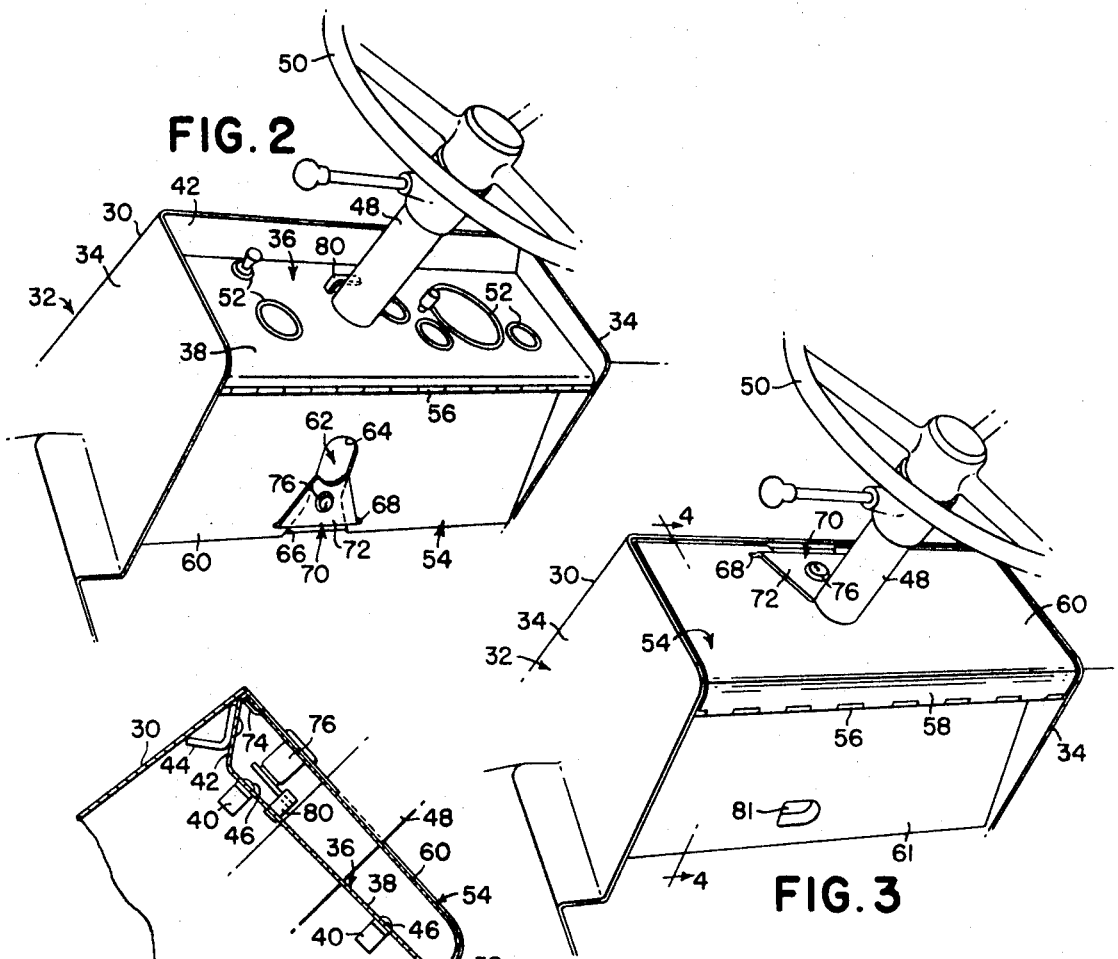
FIG. 2
FIG. 3
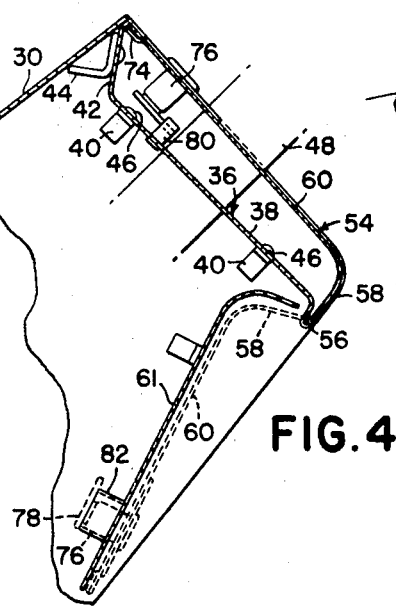
FIG. 4
INVENTORS
R. J. MEYER
L. G. HALPIN

VEHICLE INSTRUMENT PANEL COVER

BACKGROUND OF THE INVENTION

This invention relates to a vandalproof instrument panel cover for industrial equipment or the like, and particularly relates to a variation of the instrument panel cover disclosed in the commonly assigned application Ser. No. 763,080 of Connor et al. filed Sept. 27, 1968 for use with vehicles that have steering columns projecting upwardly through their instrument panels.

As stated in the above-noted application, many types of industrial equipment are frequently left at the job site between working hours and since they are left unprotected, they are subject to frequent incidents of vandalism. One type of vandalism often encountered is the breakage of glass and other damage to the instrument panel at the operator's station. Since proper functioning of the instruments is vital to the proper and safe operation of the machine, it is necessary to replace the damaged instruments, resulting in substantial expense and downtime of the machine while repairs are being made.

SUMMARY OF THE INVENTION

According to the present invention, a sturdy, lockable cover is provided for protecting the instrument panel of an industrial vehicle, or the like, when the vehicle is not in use. More specifically, a single, specially constructed instrument panel cover for use with vehicles having a steering column projecting upwardly through the instrument panel is provided, so that the instrument panel cover surrounds the steering column when the cover is in its closed position. Still another feature is to provide an instrument panel with a latch-carrying section that is removable to expose a notch to permit passage of the steering column as the cover is swung between its stored and closed positions, and that is fixed in place by operation of the latch it carries.

BRIEF DESCRIPTION OF THE DRAWINGS

FIG. 1 is a side elevation view of an industrial vehicle embodying the present invention.

FIG. 2 is a perspective view of the instrument panel cover of the vehicle, with the instrument panel shown locked in its open or stored position.

FIG. 3 is a view similar to FIG. 1, but showing the instrument panel cover locked in its closed position.

FIG. 4 is a view taken generally along line 4—4 of FIG. 3.

DESCRIPTION OF THE PREFERRED EMBODIMENT

The industrial vehicle chosen to illustrate the invention is an articulated four-wheel drive loader having front and rear sections 10 and 12 respectively, which are connected by a central vertical pivot so that the front and rear sections are swingable relative to one another about a vertical axis to steer the vehicle. The front section 10 is supported on a pair of driven front wheels 14 and the rear section 12 is mounted on a pair of driven rear wheels 16. A conventional bucket-type loader mechanism, indicated in its entirety by the numeral 18, is carried by the front section, while the vehicle's engine (not shown) is carried by the rear section 12, the engine being disposed within the rearward hood 20.

Also carried by the rear section, at the forward end thereof, is an elevated operator's station, indicated in its entirety by the numeral 22. The operator's station includes a seat 24 and a relatively horizontal floor 26, which extends forwardly of and below the front edge of the seat 24. The forward portion of the floor 26 is partially enclosed by a front wall 28, a centrally positioned upwardly and rearwardly inclined top wall 30, and inwardly stepped sidewalls 32. Upper portions 34 of the sidewalls 32 join at right angles to the top wall 30 to form an inverted, upwardly and rearwardly inclined channel. An instrument panel 36 is snugly disposed within the upper end of the channel and includes a generally rectangular planar portion 38 supported at its opposite sides on tabs 40 carried by the upper sidewall portions 34 and an upwardly and forwardly inclined front portion 42 supported on a complementary angle member 44 extending transversely to the top wall 30. Conventional screw fasteners 46 secure the instrument panel to the tabs and the angle member. A steering column 48 extends upwardly and rearwardly from the forward end of the floor 26 in the fore-and-aft centerline of the operato's station and projects through an opening in the middle of the instrument panel 36. The steering column 48 generally parallels the top wall 30 and terminates immediately to the rear of the rear edge thereof forwardly of the seat 24, and a steering wheel 50 is mounted at the upper end of the steering column in the conventional manner, wherein it can be manipulated by the operator from the seat 24.

The instrument panel 36 carries a number of conventional instruments 52, the instruments being schematically illustrated and including such instruments as the fuel gauge, temperature gauge, pressure gauge, tachometer, warning lights and ignition lock, the indicator portions of the instruments facing the seat 24 and the wiring and associated components of the instruments being disposed within the cavity formed by the instrument panel 36 and the front, top and sidewalls 28, 30 and 32 respectively.

An instrument panel cover, indicated generally by the numeral 54, is mounted on the instrument panel 36 by means of a transverse pivot or hinge 56 at the lower, rearward edge of the panel 36. The cover 54 is relatively flat and includes a narrow first, generally rectangular portion 58 having an edge connected to the hinge 56 and an opposite edge that merges at approximately 90° into a second, generally rectangular portion 60 having dimensions similar to the rectangular portion 38 of the instrument panel. The cover 54 is swingable on its hinge 56 between a closed or generally upwardly and forwardly inclined position wherein its free transverse end engages the upper edge of the instrument panel 36 and an open or stored position spaced approximately 270° about the hinge 56 from the closed position, wherein it is back under the panel 36 and in parallel relationship to a storing wall 61. The transverse free end of the instrument panel 36 is notched, as at 62, to permit passage of the steering column 48 as the panel is swung between its open and closed positions. The notch 62 includes an inner portion 64, dimensioned to snugly receive the lower side of the steering column 48, which merges into a flared mouth portion 66. The opposite sides of the mouth portion 66 adjacent its entrance have transverse slits 68 extending therefrom, for a purpose to be explained below.

The cover 54 carries a mechanism, generally indicated by the reference numeral 70, for locking the cover in its closed and open positions. The mechanism 70 includes a generally triangular plate 72 which spans the mouth portion 66 of the notch 62 with two sides generally parallel to the sides of the mouth portion 66 and with a lip 74 along its third side removably received in the slits 68. The plate 72 carries a centrally mounted conventional key-operated locking device 76 which has a rotatable tooth 78 turnable only by a key. The rotatable tooth 78 is engageable with a hook 80 projecting upwardly and laterally from the panel 36 above the steering column to lock the cover 54 in its closed position as well as lock the plate 72 within the slits 68. The storing wall 61 has a recess 81 for receiving the lock device 76, which recess has a flange 82 at one side that is engaged by the rotatable tooth 78 to lock the cover 54 in its open or stored position, and again, to lock the plate 72 within the slits 68. It is to be noted that the plate 72 is moved between opposite sides of the cover 54 when the cover is moved between its open and closed positions.

Before the vehicle is started, the instrument panel cover 54 is unlocked by means of the key-operated lock 76. The plate 72 is then removed from the slits 68 to expose the notch 62 and the cover 54 is swung downwardly about the hinge 56 far enough to clear the steering column 48 and then the plate 72 is reinserted in the slits 68, but from the opposite side of the cover. The cover 54 is then swung against the storing wall 61, approximately 270° from the closed position, and the lock 76 is again engaged to lock the cover in the open or stored position. The above procedure is reversed at the end of the day, when the vehicle is to be left unattended, to place the cover 54 in the closed position.

We claim:

1. In a vehicle having an operator's station including an operator's seat, a floor, and a generally upright front wall rising from the forward part of the floor, an instrument panel being forwardly of and facing the seat and being rearwardly of the front wall, and a vehicle control member extending upwardly through the midportion of the instrument panel, the improvement comprising: an instrument panel cover; horizontal pivot means operatively mounting the cover on the vehicle for swinging movement between a closed position wherein the cover is over the instrument panel and an open position wherein it is disposed below the instrument panel; a notch in the instrument panel cover positioned for permitting passage of the control member as the cover is swung between its open and closed positions; and lock means associated with the cover to simultaneously releasably close the entrance of the notch and lock the cover in either the open or closed position.

2. The invention defined in claim 1 wherein the notch has slits at opposite sides and the lock means includes a plate having a lip releasably received in said slits and carrying a key-operable locking device.

3. In a vehicle having an operator's station having an operator's seat, a floor, and a generally upright front wall rising from the forward part of the floor, an instrument panel being forwardly of and facing the seat and being rearwardly of the front wall, and a vehicle steering column extending upwardly from the floor through the midportion of the instrument panel, the improvement comprising: an instrument panel cover having one edge hingedly secured adjacent the bottom of the instrument panel and having an opposite free edge and being swingable between a closed position wherein the cover is over the instrument panel and an open position wherein it is disposed below the instrument panel; a notch in the free edge of the instrument panel cover positioned for permitting passage of the steering column as the cover is swung between its open and closed positions and lock means associated with the cover to simultaneously releasably close the entrance of the notch and lock the cover in either of the open or closed positions.

4. The invention defined in claim 3 wherein the notch has slits at opposite sides and the lock means includes a plate having a lip releasably received in said slits and carrying a key-operable locking device.

5. In a vehicle having an operator's station including an operator's seat, a floor, and generally upright front and sidewalls rising from the floor, an instrument panel between the walls and the seat, facing the seat, and a steering column extending upwardly through the instrument panel, the improvement comprising: an instrument panel cover; means mounting the cover for permitting movement from an open stored position below the instrument panel to a closed position over the instrument panel, said cover being notched for receiving the steering column when the cover is moved from its open to its closed position, a storing wall below the instrument panel and lock means operatively associated with the instrument panel, cover and storing wall for releasably securing the cover in its open and closed positions.

6. The invention defined in claim 5 wherein the lock means includes a plate and means for releasably securing the plate across the notch when the cover is in its open and closed positions.